(12) United States Patent
Kim et al.

(10) Patent No.: US 8,144,335 B2
(45) Date of Patent: Mar. 27, 2012

(54) VIBRATION-INSENSITIVE INTERFEROMETER USING HIGH-SPEED CAMERA AND CONTINUOUS PHASE SCANNING METHOD

(75) Inventors: Seung-Woo Kim, Yuseong-gu (KR); Jung-Jae Park, Seo-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 387 days.

(21) Appl. No.: 12/566,008

(22) Filed: Sep. 24, 2009

(65) Prior Publication Data
US 2010/0259762 A1 Oct. 14, 2010

(30) Foreign Application Priority Data
Apr. 8, 2009 (KR) .................. 10-2009-0030379

(51) Int. Cl.
*G01B 11/30* (2006.01)
(52) U.S. Cl. ..................... 356/495; 356/512
(58) Field of Classification Search .......... 356/489, 356/495, 511–514
See application file for complete search history.

(56) References Cited

U.S. PATENT DOCUMENTS

| 3,857,636 | A * | 12/1974 | Angelbeck | 356/450 |
|---|---|---|---|---|
| 7,405,830 | B2 * | 7/2008 | Kim et al. | 356/495 |
| 7,471,398 | B2 * | 12/2008 | Saunders et al. | 356/512 |
| 2004/0252311 | A1 * | 12/2004 | Ishii et al. | 356/512 |

* cited by examiner

*Primary Examiner* — Samuel A Turner
(74) *Attorney, Agent, or Firm* — Sherr & Vaughn, PLLC

(57) ABSTRACT

The present invention relates to a vibration-insensitive interferometer using a high-speed camera and a continuous phase scanning method. The interferometer measures a measurement target by completely isolating influences of externally occurring vibrations from a frequency domain. The interferometer includes a light source unit for emitting light. A light transmission unit radiates the light emitted from the light source unit to the measurement target, splits light reflected from the measurement target into reference light and measurement light, and allows the reference light and the measurement light to interfere with each other, thus generating an interference fringe. A continuous phase scanning unit for radiates the reference light split by the light transmission unit through continuous phase scanning. A high-speed camera acquires an interference fringe generated by both the measurement light radiated through the light transmission unit and the reference light radiated through the continuous phase scanning unit.

16 Claims, 5 Drawing Sheets

VIBRATION-INSENSITIVE INTERFEROMETER USING HIGH-SPEED CAMERA AND CONTINUOUS PHASE SCANNING METHOD

CROSS REFERENCE TO PRIOR APPLICATION

The present application claims priority under 35 U.S.C. 119 and 35 U.S.C. 365 to Korean Patent Application No. 10-2009-0030379 (filed on Apr. 08, 2009), which is hereby incorporated by reference in its entirety.

BACKGROUND OF THE INVENTION

1. Field of the Invention

The present invention relates, in general, to a vibration-insensitive interferometer using a high-speed camera and a continuous phase scanning method, and, more particularly, to an interferometer for meteorological observations, which can measure the surface of a target in an environment having serious disturbances such as vibrations or air movements, using an optical interference method, with high precision and resolution and at high speed.

2. Description of the Related Art

Generally, in order to measure the shape of manufactured optical parts when the optical parts, wafers or glass products are being manufactured, a Fizeau interferometer, a point diffraction interferometer, etc. based on the principle of interference have been used. Methods of processing optical parts such as lenses or mirrors overcome the disadvantages of existing simple polishing processes, and have gradually advanced towards automation, enabling spherical or aspherical free-form surfaces having a variety of curvatures to be processed at the present time, and such automation has been widely popularized.

However, this processing technology is automated whereas measurement equipment for the technology is not yet automated, and thus a processor and a measuring device are independent of each other without there being formed therebetween a feedback-based control relationship. Further, as the size of devices increases in semiconductor wafers or display fields such as Liquid Crystal Displays (LCDs) and Plasma Display Panels (PDPs), a measuring device capable of measuring a wide area at one time is required, but, in fact, a suitable method complying with this requirement has not yet been provided.

The most significant cause of these problems is that an optical interferometer used as a measuring device is greatly susceptible to changes in the environment, in particular, to vibrations. Due thereto, measurement results are inadequate, and consequently the optical interferometer cannot be applied to a production process for producing optical parts where there are serious vibrations.

In order to solve these problems, research into interferometers less susceptible to vibrations has been conducted using a variety of methods.

One of these methods is a method of directly measuring the variation in an interference fringe attributable to vibrations using a sensor, and feeding the interference fringe variations back to the driving of a reference reflective surface, thus stabilizing the interference fringe (refer to T. Yoshino et al., Opt. Lett., 23, p.1576). However, in this method, since vibration frequency that can be controlled is limited according to the bandwidth of the sensor and an actuator, it is impossible to prevent interference fringes from being averaged due to high-frequency vibrations which are above the vibration frequency.

Another method, that is, spatial phase shifting, is known to be less susceptible to vibrations because it enables the analysis of interference fringes in real time (refer to R. A. Smythe et al., Opt. Eng., 23, p.361). FIG. 1 is a diagram schematically showing a spatial phase-shifting interferometer. However, this scheme is also disadvantageous in that the vibration frequency that can be controlled is limited according to the bandwidth of a camera used for measurement, and repeatability between the results of successive measurements greatly decreases due to the influences of different types of vibrations at the time of repeatedly performing the measuring, thus making it impossible to obtain reliable measurement values.

A further method, that is, a common path interferometer, is advantageous in that, since similar vibration components exist both on a reference wavefront and on a measurement wavefront, interference fringes can be basically stabilized.

Further, an interferometer using a diffraction grating and a pinhole may be a solution capable of taking the advantages of all of the above-described interferometers and overcoming the disadvantages thereof because it can simultaneously obtain three spatial phase-shifted interference fringes while supporting a common path (refer to Osuk Y. Kwon et al., Opt. Lett., 12, p.855). However, it is very difficult to actually implement such an interferometer, and it is also difficult to obtain precise measurement results because part of a distorted measurement wavefront is used as a reference wavefront generated by the pinhole.

In this way, most conventional technologies intended to obtain vibration-insensitive characteristics in shape measurement fields using optical interferometers have focused on the stabilization of interference fringes to eliminate phase vibration characteristics themselves appearing on the interference fringes. For this operation, a feedback method based on the direct detection of light intensity versus phase, a common path structure for offsetting the influences of vibrations, and a one-shot measurement using a spatial phase-shifting device or a spatial heterodyning method have been applied.

However, those methods are disadvantageous in that they require complicated optical parts for the elimination of vibration influences and phase shifting from the standpoint of a system structure, have limitations in spatial resolution, and have difficulty in individually coping with the influences of vibrations appearing differently for respective pixels.

SUMMARY OF THE INVENTION

Accordingly, the present invention has been made keeping in mind the above problems occurring in the prior art, and an object of the present invention is to provide a high-speed, high-resolution and high-precision vibration-insensitive interferometer without using complicated optical parts or a complicated analysis algorithm.

Another object of the present invention is to provide an interferometer capable of overcoming the limitations of spatial resolution and individually, easily coping with the influences of vibrations appearing differently for respective pixels.

In order to accomplish the above objects, the present invention provides a vibration-insensitive interferometer using a high-speed camera and a continuous phase scanning method, the interferometer measuring a measurement target by completely isolating influences of externally occurring vibrations from a frequency domain, comprising a light source unit for emitting light, a light transmission unit for radiating the light emitted from the light source unit to the measurement target, splitting light reflected from the measurement target into reference light and measurement light, and allowing the reference light and the measurement light to interfere with each other, thus generating an interference fringe, a continuous phase scanning unit for radiating the reference light split by the light transmission unit through continuous phase scanning, and a high-speed camera for acquiring an interference fringe generated by both the measurement light radiated through the light transmission unit and the reference light radiated through the continuous phase scanning unit.

Preferably, the light transmission unit comprises a first λ/2 delay plate for receiving the light emitted from the light source, a first polarization splitter for splitting the light having passed through the first λ/2 delay plate in polarized form, a λ/4 delay plate for circularly polarizing the light received from the first polarization splitter and radiating the circularly polarized light to the measurement target, a beam splitter for, when the light reflected from the measurement target passes again through the first polarization splitter, receiving the passed light and splitting the received light into the reference light and the measurement light, a focusing lens for receiving the reference light radiated to the beam splitter and condensing the reference light, an optical fiber for point-diffracting the light condensed through the focusing lens in a form of a spherical wave and transferring the diffracted light to the continuous phase scanning unit, a mirror for reflecting the measurement light split by the beam splitter, second λ/2 delay plates for receiving the reference light radiated by the continuous phase scanning unit and the measurement light reflected from the mirror, respectively, a second polarization splitter for splitting the reference light and the measurement light, having passed through the second λ/2 delay plates, a linear polarizer for linearly polarizing light having passed through the second polarization splitter, and an imaging lens for allowing the linearly polarized light to be incident on the high-speed camera.

Preferably, the continuous phase scanning unit comprises a collimating lens for receiving the reference light through the light transmission unit and converting the reference light into a plane wave, and a stage for actuating a guide to which the collimating lens and the optical fiber are fixed at uniform velocity.

Preferably, the continuous phase scanning unit performs scanning at multiple periods.

Preferably, the optical fiber is a single mode optical fiber (SMF).

Preferably, the continuous phase scanning unit selects a phase scanning speed in consideration of possible external vibration frequencies.

Preferably, the high-speed camera performs phase reconstruction through analysis of a frequency domain at each pixel.

Preferably, the light transmission unit forms a common path in an optical cavity between the measurement target and the interferometer.

Preferably, the stage is actuated as a piezoelectric transducer (PZT) device.

Preferably, the beam splitter has a transmissivity of 90%.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of a vibration-insensitive interferometer according to the present invention will be described in detail with reference to the attached drawings.

Figure 1:
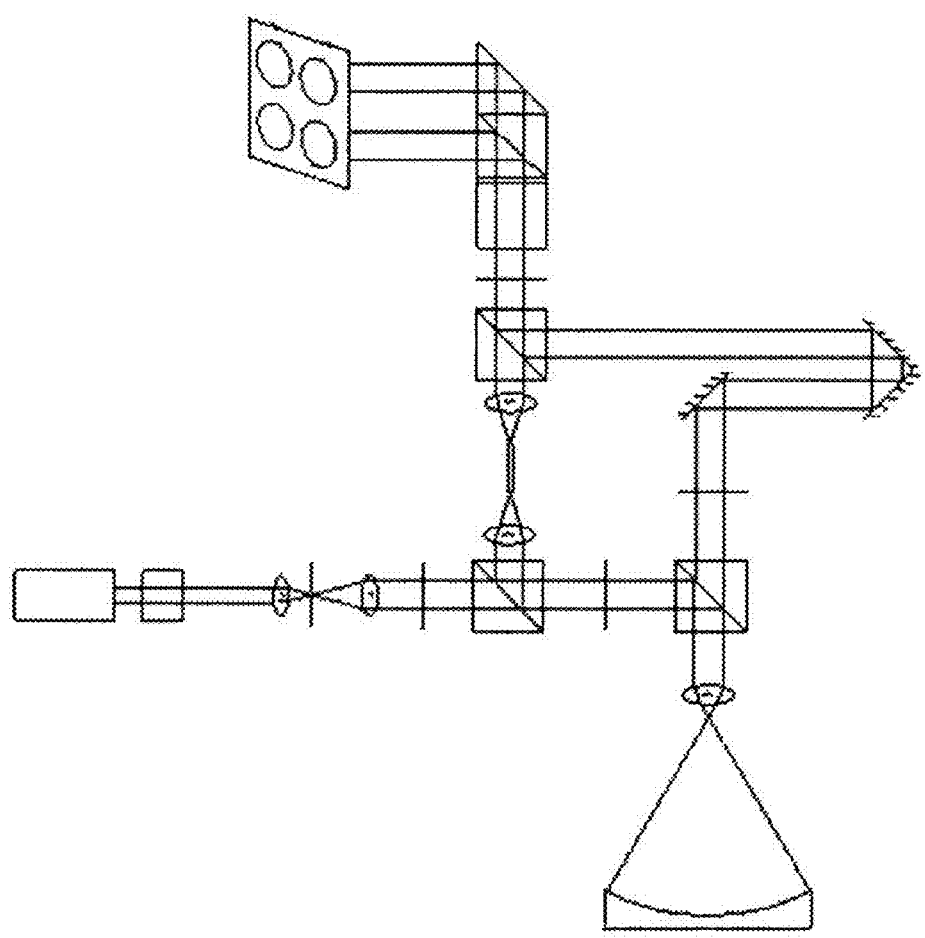
FIG. 1 is a diagram showing the construction of a conventional vibration-insensitive interferometer.
Figure 2:
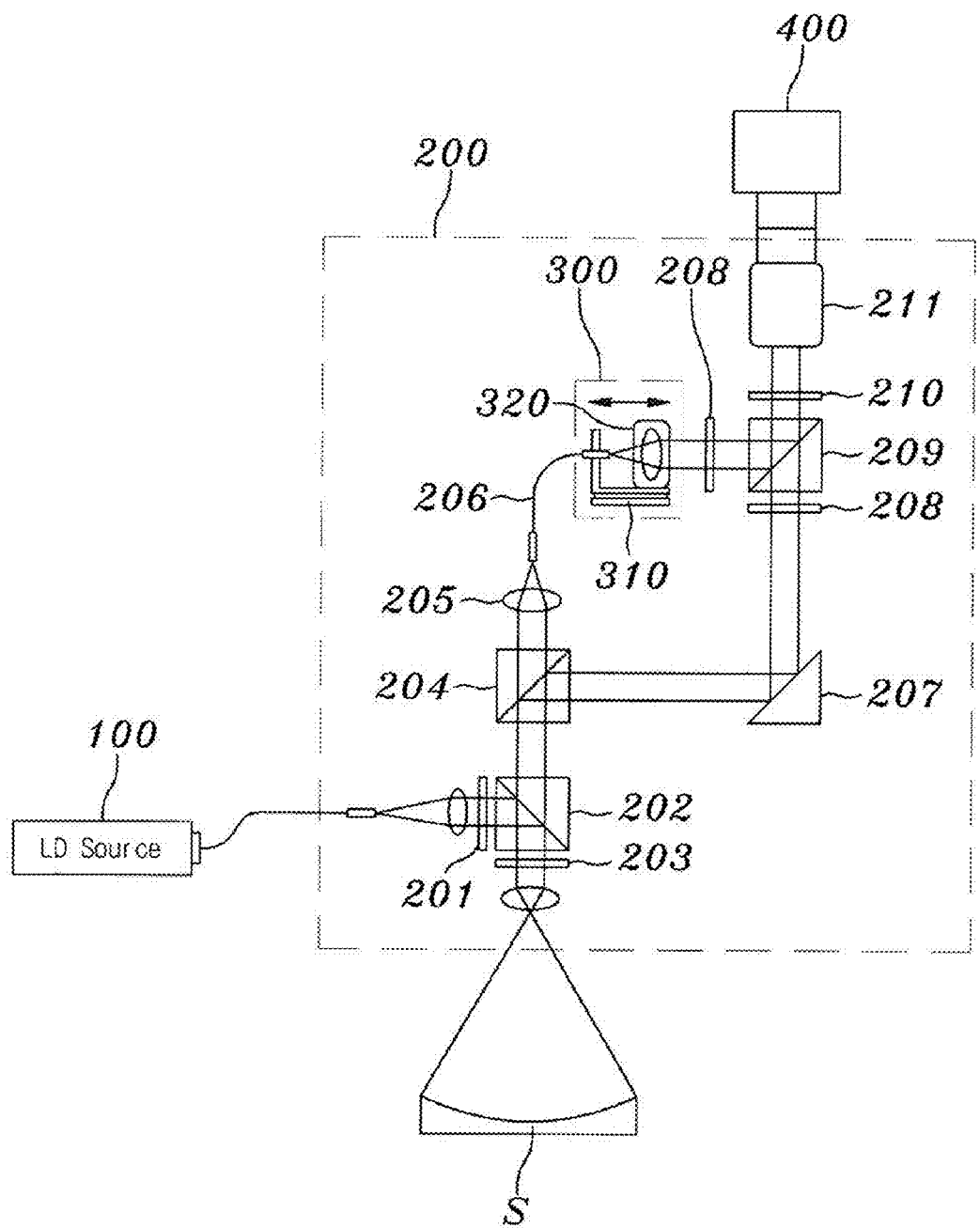
FIG. 2 is a diagram showing the construction of a vibration-insensitive interferometer using a high-speed camera and a continuous phase scanning method according to an embodiment of the present invention.
Figure 3:
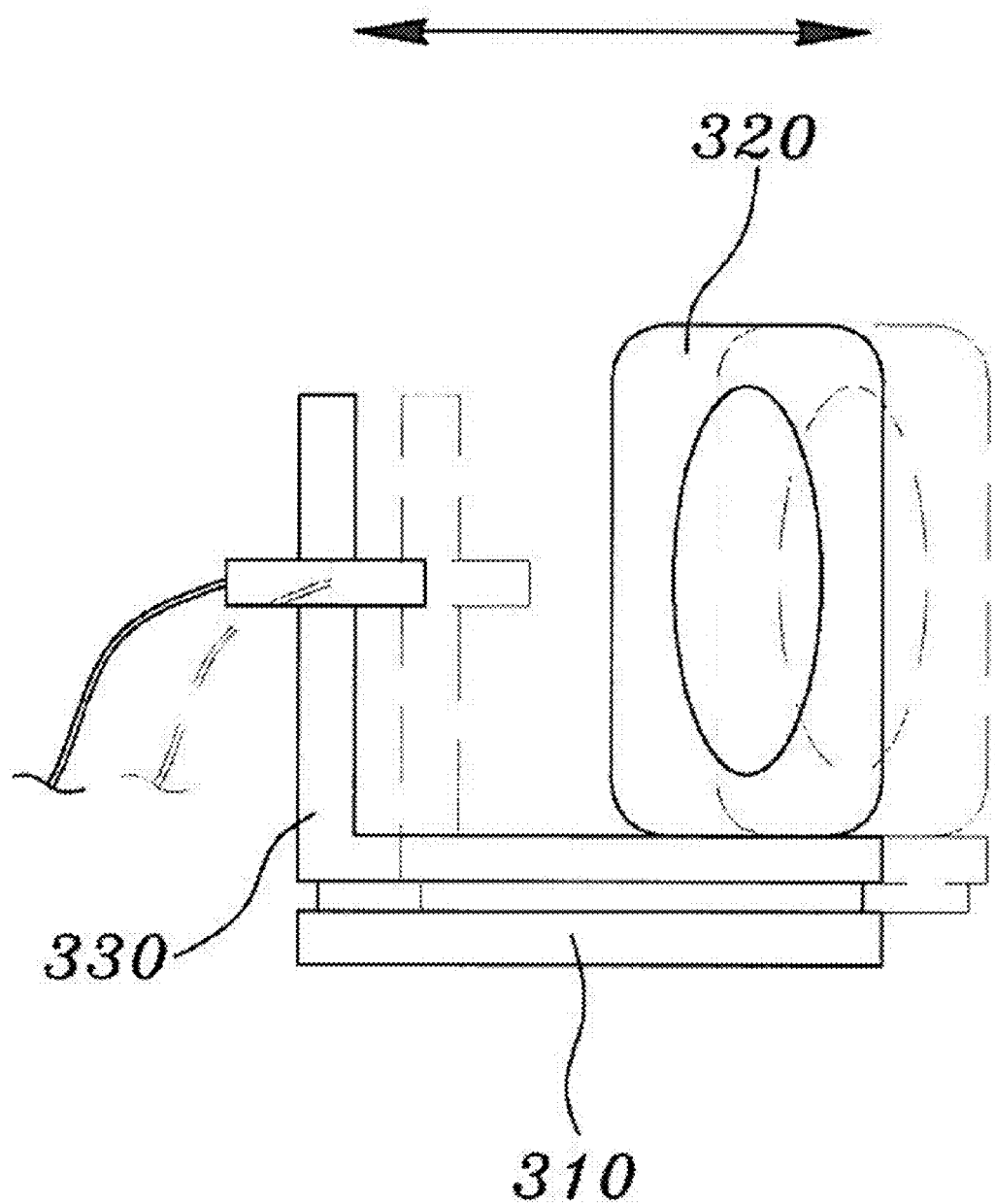
FIG. 3 is a detailed diagram showing the operational status of the continuous phase scanning unit of a vibration-insensitive interferometer according to the present invention.
Figure 4:
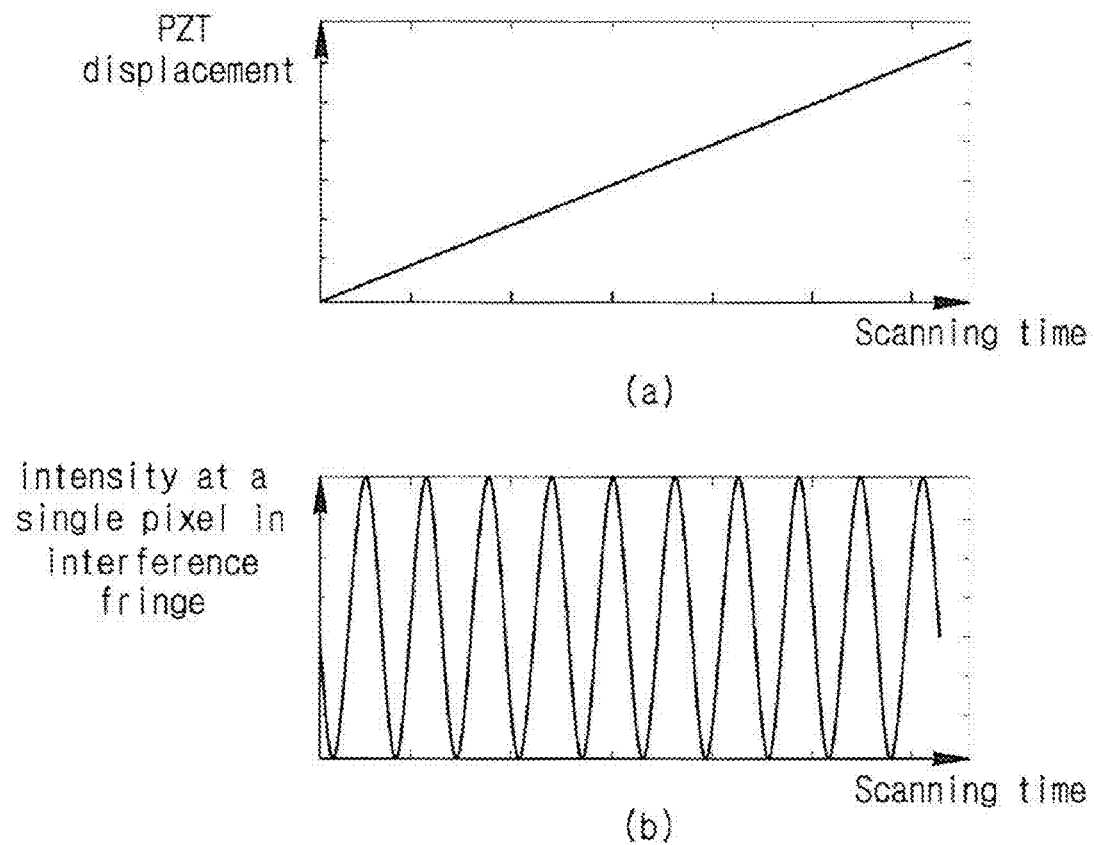
FIG. 4 is a conceptual diagram showing a continuous phase scanning method according to the present invention.
Figure 5:
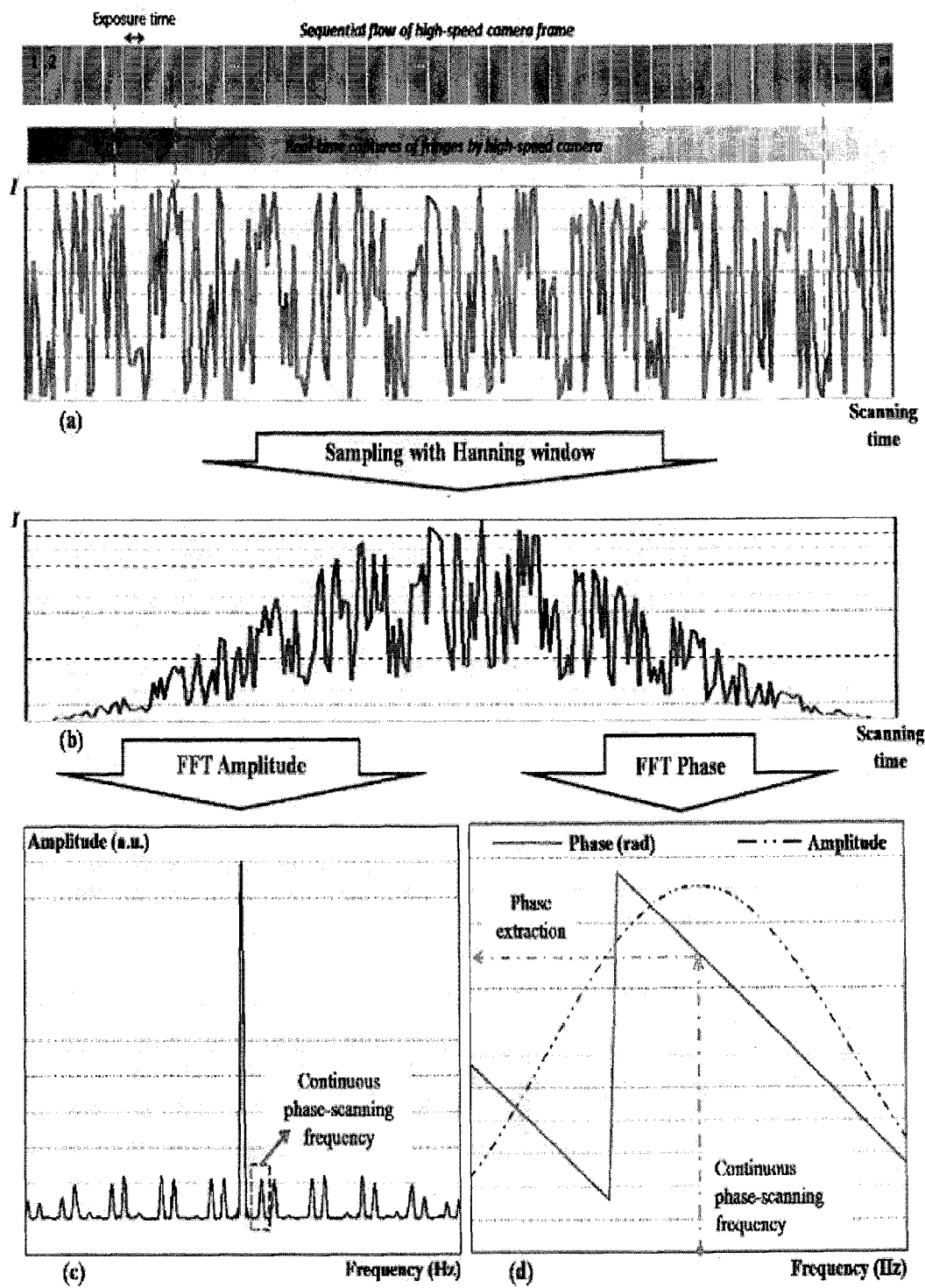
FIG. 5 is a diagram showing a phase measurement process indicating the measurement algorithm of a vibration-insensitive interferometer using a high-speed camera and a continuous phase scanning method according to the present invention.

FIG. 2 is a diagram showing the construction of a vibration-insensitive interferometer using a high-speed camera and a continuous phase scanning method according to an embodiment of the present invention, FIG. 3 is a detailed diagram showing the operational status of the continuous phase scanning unit of a vibration-insensitive interferometer according to the present invention, FIG. 4 is a conceptual diagram showing a continuous phase scanning method according to the present invention, and FIG. 5 is a diagram showing a phase measurement process indicating the measurement algorithm of a vibration-insensitive interferometer using a high-speed camera and a continuous phase scanning method according to the present invention.

A vibration-insensitive interferometer using a high-speed camera and a continuous phase scanning method according to the present invention is characterized in that, in the interferometer for measuring a measurement target by completely isolating the influences of externally occurring vibrations from a frequency domain, the interferometer includes a light source unit, a light transmission unit, a continuous phase scanning unit, and a high-speed camera. The light source unit emits light. The light transmission unit radiates the light emitted from the light source unit to the measurement target, splits light reflected from the measurement target into reference light and measurement light, and allows the reference light and the measurement light to interfere with each other, thus generating an interference fringe. The continuous phase scanning unit is driven at uniform velocity to continuously radiate the reference light, split by the light transmission unit. The high-speed camera acquires an interference fringe generated by the measurement light radiated through the light transmission unit and the reference light radiated through the continuous phase scanning unit.

The light source unit 100 emits light to measure a measurement target S, and employs a nano-sized light source in the present invention. As an embodiment, the light source unit 100 outputs light using a 635 nm-laser diode (LD).

After the light emitted from the light source unit 100 is radiated to the measurement target S through the light transmission unit 200, light reflected from the target is provided such that the light is split into light of a reference path and light of a measurement path and such that an interference fringe, obtained while the light of the reference path and the light of the measurement path are combined with each other again, can be acquired by the high-speed camera 400, which will be described later.

The construction of the light transmission unit 200 according to an embodiment of the present invention will now be described in detail. That is, the light output from the light source unit 100 is incident on a first polarization splitter 202 through an optical fiber. At this time, a first λ/2 delay plate 201 is provided upstream of the first polarization splitter and configured to delay the light by half a wavelength.

The light reflected from the first polarization splitter 202 is radiated to the measurement target S. Before the radiation of the light, the light is delayed while passing through a λ/4 delay plate 203 provided upstream along the direction of reflection. The light radiated to the target is reflected therefrom, passes through the first polarization splitter, and is then radiated to a beam splitter 204.

The light incident on the beam splitter 204 is reflected and transmitted and is split into the light of the reference path and the light of the measurement path. The light of the reference path (reference light) is point-diffracted as a perfect spherical wave by a focusing lens 205 and an optical fiber 206, and then travels. The beam splitter preferably has a transmissivity of 90%, and the optical fiber 206 is preferably implemented as a single mode optical fiber (SMF).

The reference light traveling through the optical fiber 206 is incident on a continuous phase scanning unit 300, which will be described later, and is used to implement continuous phase scanning using the reference light.

Meanwhile, the measurement light, split by the beam splitter 204 as that of the measurement path, is reflected from a mirror 207 without change.

The measurement light provides aberrations of spatial wavefront distortion, indicating a degree of a processing error of a measurement surface. In the situation in which vibrations exist, such measurement light has characteristics of being dependent on time variation which must be isolated from spatial wavefront distortion so as to measure the actual shape of the measurement light. In order to solve the problem of being dependent on disturbances of time variation, the reference light is generated by allowing the measurement light to pass through the single mode optical fiber. At this time, time variation characteristics attributable to vibrations are maintained, whereas only the aberrations of spatial wavefront distortion are eliminated due to the characteristics of mode filtering. Therefore, since similar vibration characteristics existing on the two wavefronts are offset when the reference light meets the measurement light, resulting interference fringes are influenced only by aberrations of spatial wavefront distortion. Such an interference fringe is acquired by the high-speed camera, and phase shifting is performed by changing the optical path through a stage during the acquisition of the fringe.

The reference light continuously radiated by the continuous phase scanning unit 300 and the light reflected from the mirror 207 pass through their own second λ/2 delay plates 208, are incident on a second polarization splitter 209, and then come together again. The light traveling from the mirror 207 passes through the second polarization splitter 209, and the light traveling from the continuous phase scanning unit 300 is reflected from the second polarization splitter 209, and thereby the above light components travel through one path. Through a linear polarizer 210 located in the direction of this path, the interference fringe is generated. The generated interference fringe passes through an imaging lens 211, and is then incident on the high-speed camera, which will be described later.

The process of the light transmission unit is described in detail. The light emitted from the light source unit and propagated through a delivery fiber has linearly polarized characteristics. When this light passes through the first λ/2 delay plate 201, the direction of polarization is rotated. Since the first polarization splitter 202 has characteristics of reflecting only a specific polarized component, and passing another perpendicularly polarized component therethrough, it is possible to adjust the amount of light radiated to the measurement target S by rotating the first λ/2 delay plate.

At this time, when the light reflected from the first polarization splitter 202 passes through the λ/4 delay plate 203, a linearly polarized component is converted into a circularly polarized component. When the light, reflected from the surface of the measurement target and moved upwards, passes through the λ/4 delay plate again, the circularly polarized component is converted into the linearly polarized component perpendicular to the direction of the polarized component initially reflected from the first polarization splitter.

Therefore, this linearly polarized component passes through the first polarization splitter without change, and is then incident on the beam splitter 204. Since the beam splitter is manufactured to have a transmissivity of 90% with respect to a wavelength used, 90% light is propagated through the reference path and the remaining 10% of light is propagated through the measurement path.

The light propagated through the reference path is incident on the single mode optical fiber 206 through the condensing lens 205, and the light propagated through the measurement path is reflected from a folding mirror 207, passes through the second λ/2 delay plate 208 installed to adjust the amount of measurement light, and then reaches the second polarization splitter 209.

Since the two light components meeting at the second polarization splitter have linear polarization characteristics perpendicular to each other, the two light components must be mixed at a specific polarization axis using the linear polarizer 210 so as to induce interference between the two wavefronts. The wavefronts interfering with each other through this process are detected in the form of an interference fringe by the imaging lens 211 and the high-speed camera 400.

As described above, the continuous phase scanning unit 300 is operated to directly detect, through the analysis of a frequency domain, initial phase values, which are related to respective locations of the surface of the target to be measured and are carried in phase scanning frequencies, by way of continuous phase scanning while receiving the reference light split by the beam splitter 204 and being driven at uniform velocity.

The continuous phase scanning unit 300 includes a stage 310 actuated as a piezoelectric transducer (PZT), and a collimating lens operating in conjunction with the stage 310. Although not shown in the drawing, the continuous phase scanning unit 300 includes a separate actuating driver (not shown) for actuating the stage, both the end of the optical fiber and the collimating lens are fixed to a separate guide 330, and the stage 310 actuates the guide 330. Both the end of the optical fiber and the collimating lens are fixed to the guide 330 fastened to the PZT stage while being spaced apart from each other by a predetermined distance. When the stage is actuated, the guide is actuated while the location relationship between the optical fiber and the collimating lens is not changed, that is, in an identical state.

The speed of the stage for continuous phase scanning, that is, phase scanning speed, may be set as a suitable speed in consideration of possible vibration frequencies. On the basis of this speed, a vibration component itself is detected and isolated, and thus free phase reconstruction becomes fundamentally possible.

The continuous phase scanning unit 300 will be described in detail. As shown in FIG. 3, the continuous phase scanning unit 300 includes a stage 310 capable of producing translation in the direction of an optical axis together with the end of the optical fiber, and a collimating lens 320 for converting light emitted from the optical fiber into a plane wave, wherein the stage 310 and the collimating lens 320 are installed with the locations thereof fixed.

FIGS. 4A and 4B are conceptual diagrams of a continuous phase scanning method, wherein FIG. 4A illustrates the trend of variation in the displacement of the stay over scanning time, FIG. 4B illustrates variation in the light intensity versus phase at one pixel of an interference fringe when multi-period $2\pi$ scanning is implemented.

When the stage 310 is translated at uniform velocity, the distance of actuation by the stage (PZT) has characteristics of increasing at a uniform slope over time, and thus light intensity versus phase appearing at an arbitrary pixel on the interference fringe exhibits characteristics (properties of the interference fringe signal) of being repeated at regular periods in the form of a sine wave, as shown in FIG. 4B. That is, when the multi-period sine wave signal repeatedly appearing in this way is processed by a Fast-Fourier Transform (FFT), a specific frequency peak generated through continuous phase scanning is detected. When a phase value at that frequency is extracted, an initial phase value at the location at which the phase has been detected can be known.

Phase shifting is caused by continuously changing the optical path of the reference light through the uniform actuation of the stage. A signal for variation in temporal light intensity observed at an arbitrary location of a measured wavefront exhibits sine-wave modulated characteristics, which can be represented by the following Equation (1), $$g(t) = I_0\{1 + V\cos[\phi + \phi(t) + r\cos(2\pi v_v t + \beta)]\} \quad (1)$$

where $\phi(t) = 2\pi v_0 t$ where $I_0$ is average light intensity, $v$ is the visibility of an interference fringe, $\phi$ is the phase information of a wavefront to be measured, and $\phi(t)$ is a phase shifting function generated by the PZT actuator. A phase variation component appearing due to the influences of vibrations is assumed to have an amplitude of $r$, a frequency of $v_v$, and an initial phase of $\beta$ and the phase shifting function $\phi(t)$ has characteristics of linearly varying in the form of $2\pi v_0 t$ with the passage of time. Further, phase modulation frequency $v_0$ generated due to phase shifting may be represented by $v_0 = 2v/\lambda$ using both the wavelength $\lambda$ of the light source and the translation velocity $v$ of the PZT actuator. The light intensity variation signal $g(t)$ of Equation (1) is detected by the high-speed camera in real time, and is Fourier-transformed through digital post-processing. As a result, the following Equation can be obtained.

$$G(v) = G_0(v) + G_1(v) + G_{-1}(v) + G_{11}(v, v_v) + \quad (2)$$
$$G_{1-1}(v, v_v) + G_{-11}(v, v_v) + G_{-1-1}(v, v_v),$$

where $$G_0(v) = I_0 \delta(v)$$

$$G_{\pm 1}(v) = \frac{I_0 V}{2} \exp(\pm i\phi)\delta(v \mp v_0)$$

$$G_{1\pm 1}(v, v_v) = \frac{irI_0 V}{4} \exp[i(\phi \pm \beta)]\delta(v - v_0 \mp v_v)$$

$$G_{-1\pm 1}(v, v_v) = -\frac{irI_0 V}{4} \exp[i(-\phi \pm \beta)]\delta(v + v_0 \mp v_v)$$

The first term of Equation (2), that is, $G_0(v)$ denotes a dc component of an interference fringe. Further, $G_1(v)$ and $G_{-1}(v)$ denote the peaks of phase-modulation frequencies at locations $v_0$ and $-v_0$ appearing due to continuous phase shifting, $G_{1\pm 1}(v)$ and $G_{-1\pm 1}(v)$ denote two side peaks which have an offset of $v_v$ and are symmetrically distributed around $G_1(v)$ and $G_{-1}(v)$. When vibration frequencies other than $v_v$ are present, the characteristics of phase variation attributable to the vibration frequencies are added in the combination form of Equation (2). When a Fourier transform is performed on the information of the interference fringe obtained as shown in Equation (2), phase information $\phi$ to be measured can be extracted by isolating the peak $G_1(v)$ from the side peaks attributable to the influences of other vibrations. When $G(\phi, v)$ is assumed to be an isolated function of $G_1(v)$, the phase $\phi$ can be determined through the detection of peaks at the previously designated location $v_0$, and can be represented by the following Equation (3).

$$\varphi = \tan^{-1}\left(\frac{\text{Im}\{G(\varphi, v_0)\}}{\text{Re}\{G(\varphi, v_0)\}}\right) \quad (3)$$

Such a heterodyne phase measurement technology may be regarded as a specific form of a phase shifting interferometer by which a single heterodyne frequency is generated by uniform continuous phase scanning speed. The important issue required to implement this measurement technology is to select a modulation frequency $v_0$ so that $G_1(v)$ does not overlap other frequency peaks such as $G_{1\pm 1}(v)$ and $G_{-1\pm 1}(v)$, and furthermore, the selection of a suitable window function is also very important to minimize phase deformation at $G(\phi, v)$.

The high-speed camera 400 is configured to capture the interference fringe generated by the light transmission unit 200 and acquire the shape information of the measurement target S, and reconstructs the phase through the analysis of a frequency domain at each pixel of the acquired interference fringe.

Further, FIGS. 5A to 5D are diagrams of a phase measurement process indicating a measurement algorithm proposed by the present invention. In detail, FIG. 5A illustrates the trend of variation of a light intensity signal obtained in real time from one pixel of an interference fringe using a high-speed camera when a phase disturbance attributable to a vibration component is present. FIG. 5B illustrates a light intensity signal measured when single-cycle Hanning windows are applied to a time domain so as to improve the precision of phase measurement.

FIG. 5C illustrates amplitude information in a frequency domain obtained as a result of FFT performed on the signal acquired as shown in FIG. 5B. FIG. 5D illustrates phase information in a frequency domain obtained as a result of FFT performed on the signal acquired as shown in FIG. 5B In this way, a phase reconstruction method using a high-speed camera and a continuous phase scanning algorithm is based on a Phase-Shift Interferometry (PSI) theory generalized using Fourier analysis, and, in detail, a phase reconstruction process performed by a phase shifting interferometer is a concept identical to that of the extraction of the phase of a specific frequency generated by phase shifting in the frequency domain.

The present invention having the above construction is advantageous in that it does not require complicated optical parts and is very simple from the standpoint of an analysis algorithm by using a high-speed camera and a continuous phase scanning method.

As described above, the present invention is intended to maximize vibration-insensitive characteristics using a high-speed camera and a continuous phase scanning method when shape measurements are performed using the optical interferometer having the above construction and operation. Therefore, since the present invention does not require a synchronization procedure between the continuous actuation of a PZT stage and the acquisition of an interference fringe based on a camera even in phase shifting, the present invention can be greatly simplified from the standpoint of system configuration or the analysis algorithm, and the problem of non-linear errors occurring in a step-shaped phase shifting method can be solved.

Further, the present invention is advantageous in that it can directly detect, using a high-speed camera, a vibration component that may occur in a typical environment of meteorological observations, and can directly detect, by way of the analysis of a frequency domain, initial phase values which are related to respective locations of the surface of a target to be measured and which are carried in phase scanning frequencies, through continuous phase scanning, and in that it does not require a separate bucket algorithm unlike existing methods.

Furthermore, the present invention is advantageous in that it does not require synchronization between phase shifting and an interference fringe, thus improving measurement speed and measurement precision.

Although the preferred embodiments of the present invention have been disclosed for illustrative purposes, those skilled in the art will appreciate that the present invention is not limited to the construction and operation shown and described in the drawings and embodiments.

Instead, those skilled in the art will appreciate that various modifications and changes are possible, without departing from the scope and spirit of the invention as disclosed in the accompanying claims. Therefore, it should be noted that all of modifications, changes and equivalents thereof belong to the scope of the present invention.

What is claimed is:

1. A vibration-insensitive interferometer using a high-speed camera and a continuous phase scanning method, the interferometer measuring a measurement target by isolating influences of externally occurring vibrations from a frequency domain, comprising:
   a light source unit for emitting light;
   a light transmission unit for radiating the light emitted from the light source unit to the measurement target, splitting light reflected from the measurement target into reference light and measurement light, and allowing the reference light and the measurement light to interfere with each other, thus generating an interference fringe;
   a continuous phase scanning unit for radiating the reference light split by the light transmission unit through continuous phase scanning; and
   a high-speed camera for acquiring an interference fringe generated by both the measurement light radiated through the light transmission unit and the reference light radiated through the continuous phase scanning unit.

2. The vibration-insensitive interferometer according to claim 1, wherein the continuous phase scanning unit selects a phase scanning speed in relation to possible external vibration frequencies.

3. The vibration-insensitive interferometer according to claim 1, wherein the continuous phase scanning unit performs scanning at multiple periods.

4. The vibration-insensitive interferometer according to claim 3, wherein the continuous phase scanning unit selects a phase scanning speed in relation to possible external vibration frequencies.

5. The vibration-insensitive interferometer according to claim 1, wherein the high-speed camera performs phase reconstruction through analysis of a frequency domain at each pixel.

6. The vibration-insensitive interferometer according to claim 1, wherein the light transmission unit forms a common path in an optical cavity between the measurement target and the interferometer.

7. The vibration-insensitive interferometer according to claim 1, wherein the continuous phase scanning unit comprises:
   a collimating lens for receiving the reference light through the light transmission unit and converting the reference light into a plane wave; and
   a stage for actuating, at uniform velocity, a guide to which the collimating lens is fixed.

8. The vibration-insensitive interferometer according to claim 7, wherein the continuous phase scanning unit selects a phase scanning speed according to possible external vibration frequencies.

9. The vibration-insensitive interferometer according to claim 7, wherein the stage is actuated as a piezoelectric transducer device.

10. The vibration-insensitive interferometer according to claim 1, wherein the light transmission unit comprises:
    a first ½ delay plate for receiving the light emitted from the light source;
    a first polarization splitter for splitting the light having passed through the first ½ delay plate in polarized form;
    a ¼ delay plate for circularly polarizing the light received from the first polarization splitter and radiating the circularly polarized light to the measurement target;
    a beam splitter for receiving, when the light reflected from the measurement target passes again through the first polarization splitter, the passed light, and splitting the received light into the reference light and the measurement light;
    a focusing lens for receiving the reference light radiated from the beam splitter and condensing the reference light;
    an optical fiber for point-diffracting the light condensed through the focusing lens in a form of a spherical wave and transferring the diffracted light to the continuous phase scanning unit;
    a mirror for reflecting the measurement light split by the beam splitter;
    second ½ delay plates for receiving the reference light radiated by the continuous phase scanning unit and the measurement light reflected from the mirror, respectively;
    a second polarization splitter for splitting the reference light and the measurement light, having passed through the second ½ delay plates;
    a linear polarizer for linearly polarizing light having passed through the second polarization splitter; and
    an imaging lens for allowing the linearly polarized light to be incident on the high-speed camera.

11. The vibration-insensitive interferometer according to claim 10, wherein the continuous phase scanning unit selects a phase scanning speed in relation to possible external vibration frequencies.

12. The vibration-insensitive interferometer according to claim 10, wherein the optical fiber is a single mode optical fiber.

13. The vibration-insensitive interferometer according to claim 10, wherein the beam splitter has a transmissivity of 90%.

14. The vibration-insensitive interferometer according to claim 10, wherein the continuous phase scanning unit comprises:
- a collimating lens for receiving the reference light through the light transmission unit and converting the reference light into a plane wave; and
- a stage for actuating, at uniform velocity, a guide to which the collimating lens and the optical fiber are fixed.

15. The vibration-insensitive interferometer according to claim 14, wherein the stage is actuated as a piezoelectric transducer device.

16. The vibration-insensitive interferometer according to claim 14, wherein the continuous phase scanning unit selects a phase scanning speed in relation to possible external vibration frequencies.

* * * * *